(12) United States Patent
Fischetti et al.

(10) Patent No.: US 9,033,583 B1
(45) Date of Patent: May 19, 2015

(54) CAGE ASSEMBLY FOR A BEARING

(71) Applicant: General Electric Company, Schenectady, NY (US)

(72) Inventors: Thomas Joseph Fischetti, Fountain Inn, SC (US); Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/159,491

(22) Filed: Jan. 21, 2014

(51) Int. Cl.
*F16C 33/38* (2006.01)
*F16C 33/50* (2006.01)

(52) U.S. Cl.
CPC ........... *F16C 33/502* (2013.01); *F16C 33/3812* (2013.01)

(58) Field of Classification Search
CPC .. F16C 33/3812; F16C 33/3818; F16C 33/50; F16C 33/502; F16C 33/504; F16C 33/51; F16C 33/513; F16C 33/516
USPC .................................. 384/523, 528, 572, 578
See application file for complete search history.

(56) References Cited

U.S. PATENT DOCUMENTS

| 3,356,428 | A |   | 12/1967 | Altson |          |
|-----------|---|---|---------|--------|----------|
| 4,787,264 | A | * | 11/1988 | Tamarin et al. | 74/502.3 |
| 4,844,628 | A | * | 7/1989  | Knappe | 384/510  |
| 7,703,985 | B2 |  | 4/2010  | Olsen  |          |
| 8,047,792 | B2 |  | 11/2011 | Bech et al. |     |
| 8,174,144 | B2 |  | 5/2012  | Nies   |          |
| 2006/0008192 | A1 | * | 1/2006 | Sekimoto et al. | 384/523 |

FOREIGN PATENT DOCUMENTS

EP          0 608 629 A2     8/1994

* cited by examiner

*Primary Examiner* — Phillip A Johnson
(74) *Attorney, Agent, or Firm* — Dority & Manning, P.A.

(57) ABSTRACT

The present subject matter is directed to a bearing assembly for a wind turbine. The bearing assembly includes an outer race, an inner race rotatable relative to the outer race, a plurality of rolling elements positioned between the inner and outer races, and a cage assembly configured to maintain separation between neighboring rolling elements. The cage assembly includes a plurality of cage elements and a plurality of spacers. Each of the cage elements are separated by at least one of the spacers. Further, each of the cage elements extends around at least a portion of the plurality of rolling elements. Moreover, at least one of the spacers contact one or more of the rolling elements.

20 Claims, 6 Drawing Sheets

CAGE ASSEMBLY FOR A BEARING

FIELD OF THE INVENTION

The present subject matter relates generally to bearings and, more particularly, to a cage assembly for a bearing.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. Yaw bearings permit rotation of the nacelle and are mounted between the tower and the nacelle. Pitch bearings permit rotation of the rotor blades and are mounted between the rotatable hub and one of the rotor blades. Typically, yaw and/or pitch bearings are slewing ring bearings that include an outer race and an inner race with a plurality of rolling elements (e.g. ball bearings) between the races.

As wind turbines continue to increase in size, the bearings must similarly increase in size due to increased loading. Further, in order for a bearing to withstand such loading, it must include various components that can adequately react to the increased loads. Thus, for example, previous bearings have included spacers between each of the rolling elements to maintain uniform loading throughout the bearing. Such spacers, however, tend to cause ball bunching and/or blade angle asymmetry, which can negatively affect the power necessary to turn the bearing. Thus, overall performance of the wind turbine is negatively impacted. In response, more recent bearings include a cage design constructed of single- or multi-piece elements. However, the individual pieces of the multi-piece cage design tend to overlap each other under high loads, thereby leading to failure of the bearing. In addition, the single-piece cage design is unable to float similar to the multi-piece design, and therefore, can experience wear. Because such bearings can be difficult to access and replace, failure of the bearings can result in a lengthy and expensive repair process.

Accordingly, an improved cage assembly for a bearing of a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a bearing assembly for a wind turbine. The bearing assembly includes an outer race; an inner race rotatable relative to the outer race; a plurality of rolling elements positioned between the inner and outer race; and, a cage assembly configured to maintain separation between neighboring rolling elements. The cage assembly includes a plurality of cage elements and a plurality of spacers. Each of the cage elements extends around a portion of the plurality of rolling elements. Further, adjacent cage elements are separated by at least one of the spacers. In addition, the spacers are configured between and contact neighboring rolling elements.

In a further embodiment, each of the cage elements includes a plurality of inner openings configured to surround at least one of the rolling elements. In another embodiment, each of the inner openings may be separated by a predetermined distance and the one or more spacers may define a predetermined depth, and wherein the predetermined depth is less than the predetermined distance. As such, the rolling elements separated with a spacer may be closer to each other than those separated by the cage elements, thereby providing more space for additional rolling elements within the bearing assembly.

In additional embodiments, each of the cage elements may also include opposing open-end slots. Each of the open-end slots may be configured to receive a first portion of one of the rolling elements such that a second portion of the rolling element may extend longitudinally outside of the cage elements. Thus, in one embodiment, the spacers may be configured to receive the second portions of the rolling elements such that the spacers contact the rolling elements but not the cage elements.

In still additional embodiments, the cage assembly may be placed around or within at least one of the inner or outer races. Further, the rolling elements may include any one of or a combination of the following: balls, spheres, rollers, tapered rollers, barrel-shaped rollers, cylindrical elements, or any other suitable bearing elements. In addition, the bearing assembly may include at least one of a pitch bearing or a yaw bearing for a wind turbine.

In another aspect, the present subject matter is directed to a bearing assembly for a wind turbine. The bearing assembly includes an outer race; an inner race rotatable relative to the outer race; a plurality of rolling elements positioned between the inner and outer race; and, a cage assembly configured to maintain separation between neighboring rolling elements. The cage assembly includes a plurality of cage elements and a plurality of spacers. Each of the cage elements extend around a portion of the plurality of rolling elements. Further, each of the cage elements includes opposing open-end slots configured to receive a first portion of one of the rolling elements such that a second portion of the rolling element extends longitudinally outside of the cage elements. In addition, adjacent cage elements are separated by at least one of the spacers.

In additional embodiments, each of the spacers may contact neighboring rolling elements. Further, it should be understood that the bearing assembly may further include any one of or a combination of the features described herein. In yet another aspect, the present subject matter is directed to a cage assembly for a rolling-element bearing. The cage assembly may be configured to maintain separation between neighboring rolling elements of the bearing. In addition, the cage assembly may include a plurality of cage elements and a plurality of spacers. Each of the cage elements are configured to extend around a portion of a plurality of the rolling elements of the bearing. The spacers are configured to separate adjacent cage elements. In addition, the spacers are configured to contact neighboring rolling elements.

In additional embodiments, each of the cage elements includes a plurality of inner openings configured to surround at least one of the rolling elements. Further, the cage elements may also include one or more open-end slots configured to receive a first portion of one of the rolling elements such that, when the first portion of the rolling element is received within the open-end slot, a second portion of the rolling element extends longitudinally outside of the cage element. Thus, in one embodiment, the spacers may be configured with the second portions of the rolling elements such that the spacers contact the rolling elements and not the cage elements. In still further embodiments, the cage assembly is configured to be placed around or within at least one of an inner race or an outer race of the bearing. In addition, the bearing can be utilized in any suitable bearing application, including, but not limited to a pitch bearing or a yaw bearing of a wind turbine.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
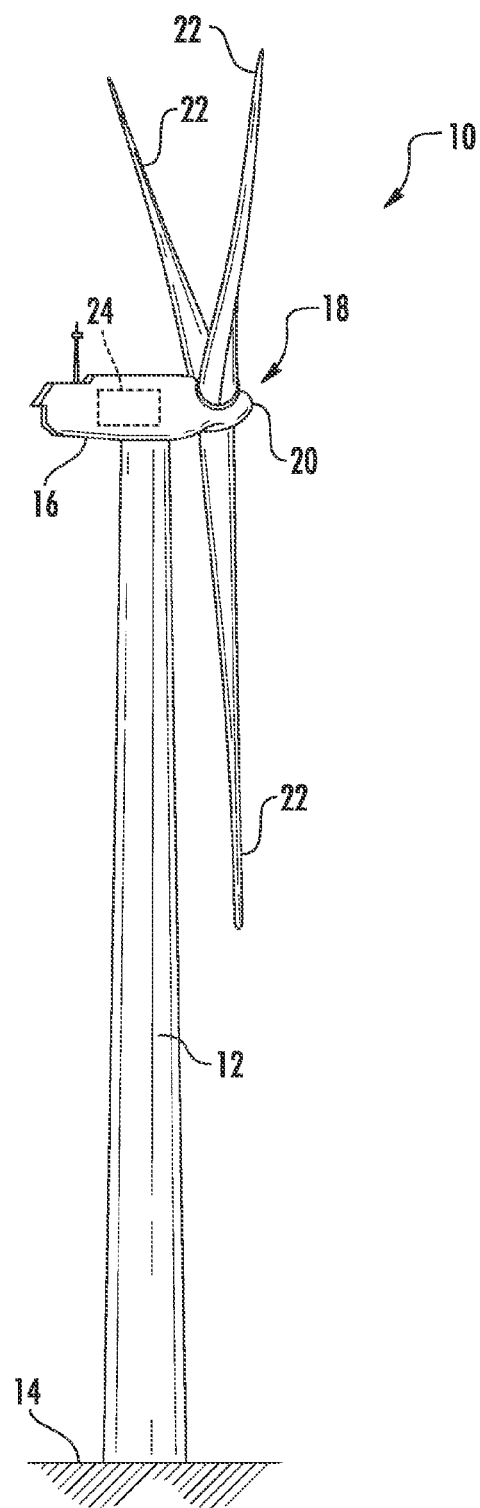
FIG. 1 illustrates a perspective view of one embodiment of a wind turbine of conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention is described herein as it may relate to wind turbine bearings, including, at least, rotor bearings, yaw bearings, pitch bearings, generator bearings, or similar. It should be appreciated, however, that the unique cage and/or bearing assembly in accordance with principles of the invention is not limited to use with wind turbine, but is applicable to any suitable bearing application.

In general, the present subject matter is directed to a cage and/or bearing assembly for a wind turbine. The bearing assembly generally includes an outer race, an inner race rotatable relative to the outer race, a plurality of rolling elements configured between the inner and outer races, and a cage assembly for maintaining separation between neighboring rolling elements. The cage assembly may be placed around or within at least one of the inner race or the outer race. Further, the cage assembly may include a plurality of cage elements separated by a plurality of spacers. In addition, each of the cage elements may extend around at least a portion of the plurality of rolling elements. Moreover, each of the spacers may contact neighboring rolling elements. In an alternative embodiment, each of the cage elements may include opposing open-end slots configured to receive a first portion of one of the rolling elements such that a second portion of the rolling element may extend longitudinally outside of the cage element. Thus, in one embodiment, the spacers may be configured with the second portions of the rolling elements such that the spacers contact the rolling elements but not the cage elements.

The cage and/or bearing assembly of the present disclosure provide numerous advantages not present in the cited art. For example, the cage assembly is capable of deflecting within the bearing assembly and is resistant to wear. Further, in various embodiments, the spacers prevent the individual cage elements from overlapping one another because the cage elements do not contact each other. In addition, the combination of spacers and cage elements as described herein reduces friction in the bearing assembly, as well as the effect of ball bunching.

Referring now to the drawings, FIG. 1 illustrates a perspective view of one embodiment of a wind turbine 10 according to conventional construction. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 positioned within the nacelle 16 to permit electrical energy to be produced.

Figure 2:
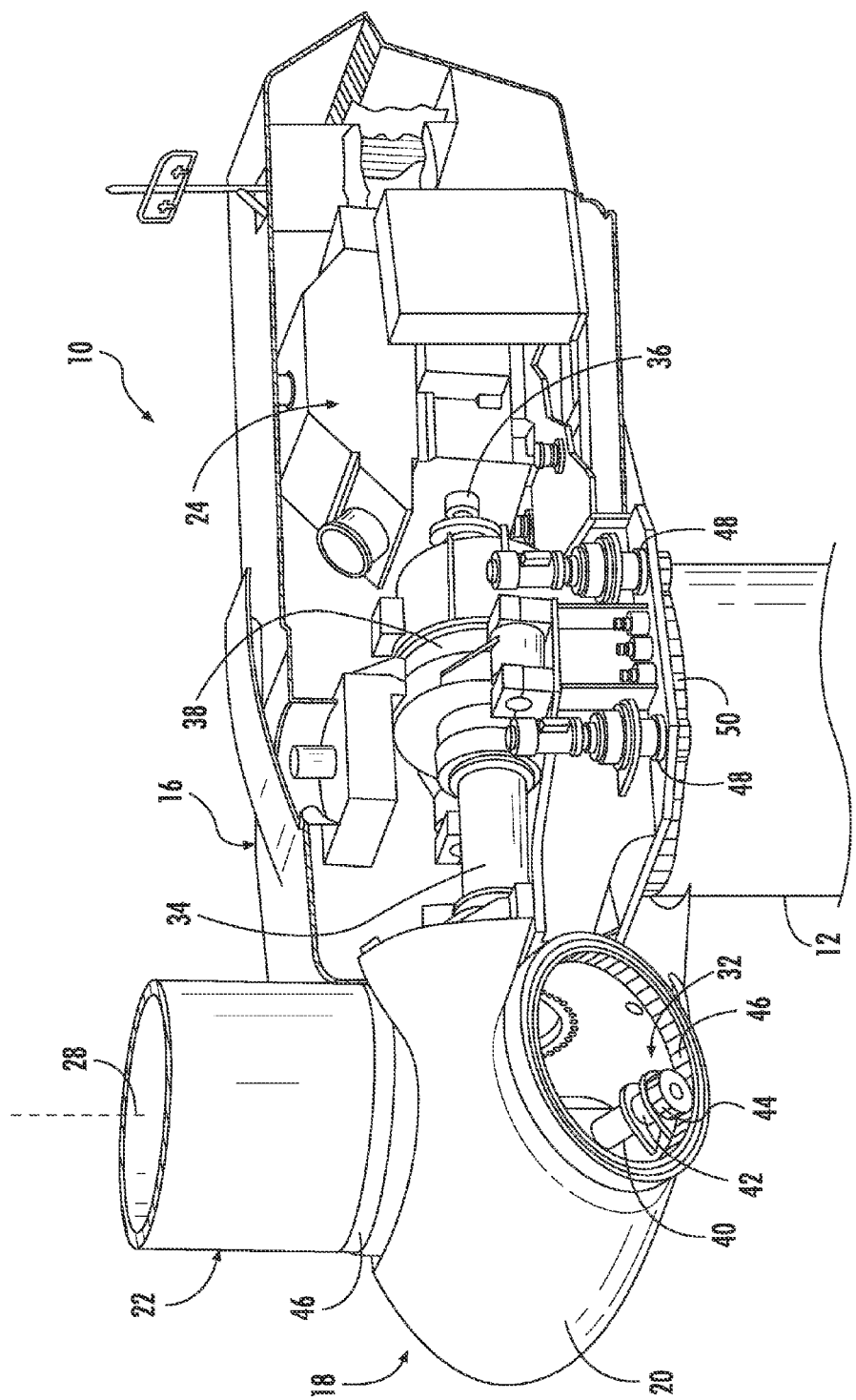
FIG. 2 illustrates a simplified, perspective view of one embodiment of a nacelle of a wind turbine according to conventional construction.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28 via a pitch bearing 46. Further, each pitch adjustment mechanism 32 may include a pitch drive motor 40

(e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with the pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 48 configured to change the angle of the nacelle 16 relative to the wind by engaging a yaw bearing 50 of the wind turbine 10.

Figure 3:
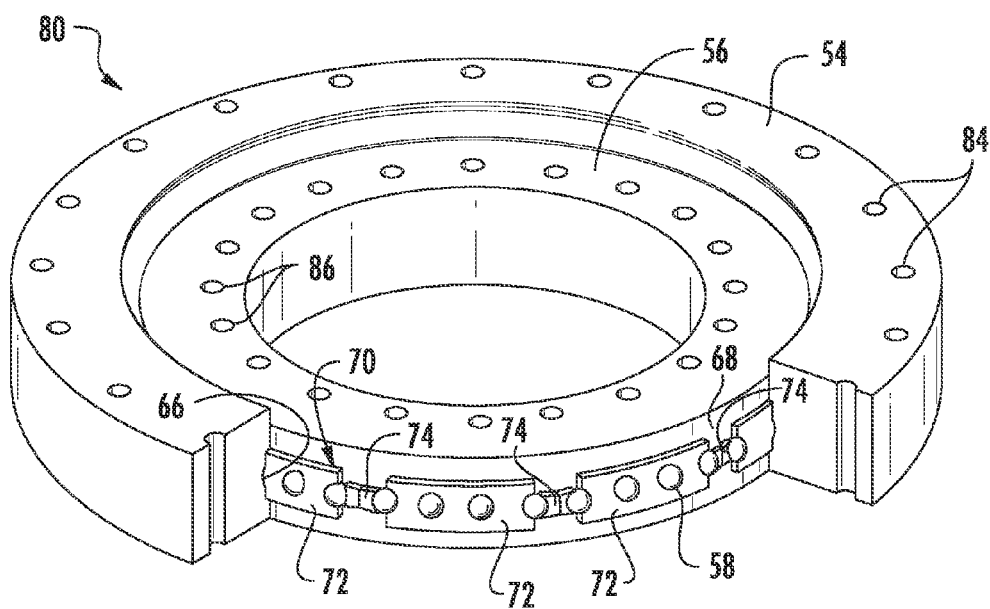
FIG. 3 illustrates a perspective view of one embodiment of a bearing assembly according to the present disclosure with a portion of the outer race removed to illustrate various internal components.
Figure 4:
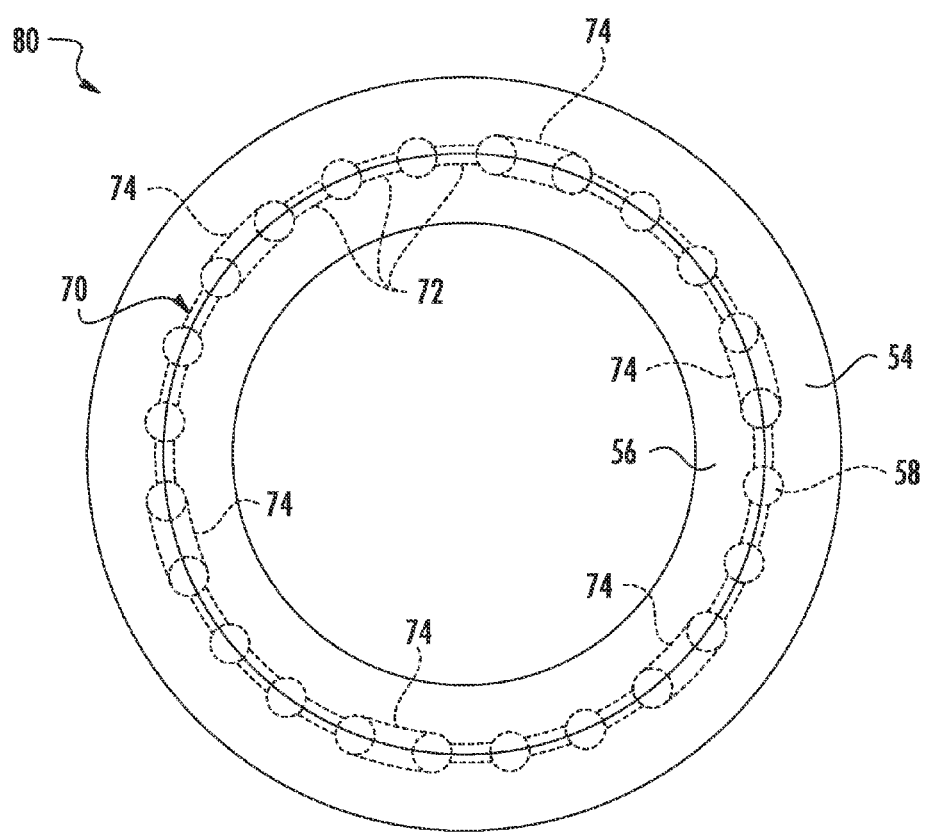
FIG. 4 illustrates a top view of one embodiment of a bearing assembly according to the present disclosure.
Figure 5:
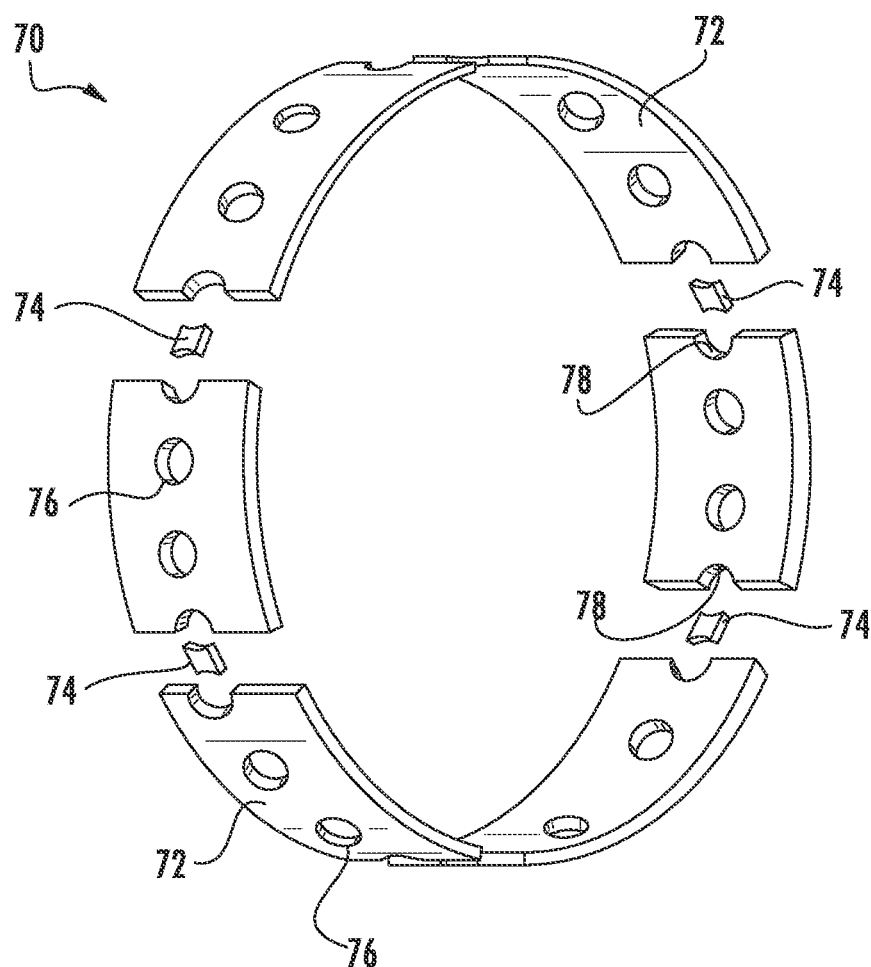
FIG. 5 illustrates a perspective view of one embodiment of a cage assembly according to the present disclosure.
Figure 6:
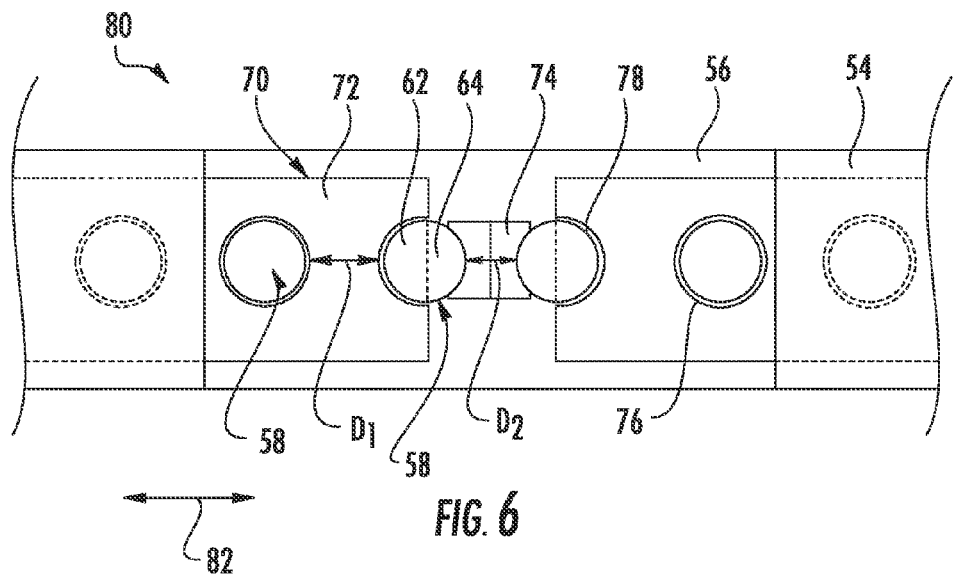
FIG. 6 illustrates a side view of a portion of one embodiment of a bearing assembly according to the present disclosure; and, FIG. 7 illustrates a side view of a portion of another embodiment of a bearing assembly according to the present disclosure.
Figure 7:
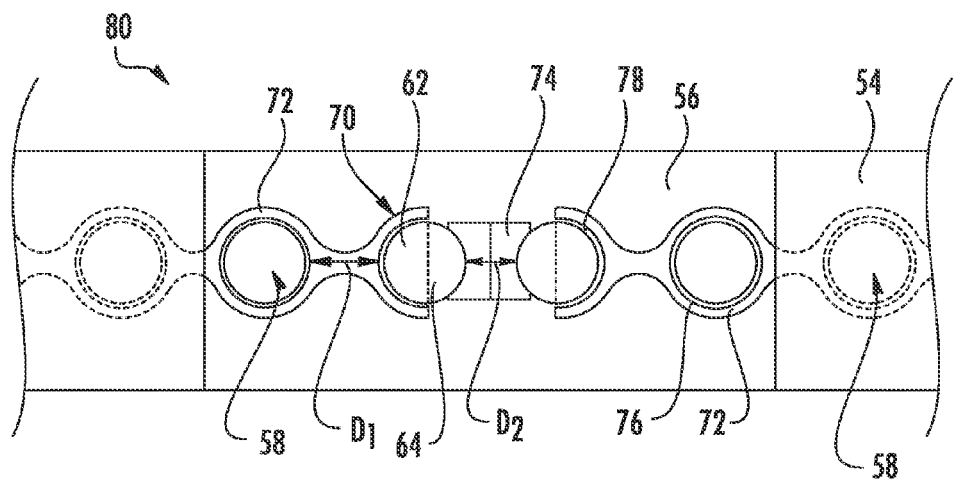

Referring now to FIGS. 3-7, several views of a bearing assembly 80 and/or cage assembly 70 in accordance with aspects of the present subject matter are illustrated. Specifically, FIG. 3 illustrates a perspective of the bearing assembly 80, with a portion of the outer bearing race 54 removed to illustrate the internal components. FIG. 4 illustrates a top view of the bearing assembly 80. FIG. 5 illustrates a perspective view of the cage assembly 70, particularly illustrating a plurality of cage elements 72 and a plurality of spacers 74. FIGS. 6 and 7 illustrate close-up, side views of different embodiments of a portion of the bearing assembly 80.

As shown, the bearing assembly 80 includes an outer bearing race 54, an inner bearing race 56, and a plurality of rolling elements 58 disposed therebetween. More specifically, the inner bearing race 56 may include one or more inner raceways 68 and the outer bearing race 54 may include one or more outer raceways 66 aligned with the inner raceways 68. As such, the rolling elements 58 may be disposed between the outer and inner and outer raceways 66, 68. As is generally understood, the inner race 56 may be configured to rotate relative to the outer race 54 (via the rolling elements 58). Accordingly, in one embodiment, the bearing assembly 80 may be utilized as a pitch bearing to allow the pitch angle of each rotor blade 22 to be adjusted (i.e. to allow the rotor blade 22 to rotate about its pitch axis 28 as shown in FIG. 2). As such, the outer race 54 of the bearing assembly 80 may generally be configured to mount to the hub 20 of the wind turbine 10, whereas the inner race 56 is configured to mount to one of the rotor blades 20 and can rotate relative to the outer race 54. In further embodiments, the bearing assembly 80 may be utilized as a yaw bearing to allow the yaw angle of the nacelle 16 to be adjusted relative to the tower 12. As such, the outer race 54 may generally be configured to mount to the tower 12 of the wind turbine 10, whereas the inner race 56 is configured to mount to the nacelle 16 and can rotate relative to the outer race 54. In additional embodiments, the bearing assembly 80 may be used in another other suitable bearing application. Accordingly, the outer race 54 and the inner race 56 may include a plurality of axial openings 62, 64 configured to receive corresponding bolts and/or any other suitable fastening mechanisms, respectively. Alternatively, the inner race 56 of the bearing assembly 80 may be fixed, whereas the outer race 54 may rotate relative to the inner race 56.

In further embodiments, the rolling elements 58 as described herein may include any suitable roller. For example, the rolling elements 58 may include any one of or combination of the following: one or more balls, spheres, rollers, tapered rollers, barrel-shaped rollers, cylindrical elements, or any other suitable rolling elements. In addition, any suitable number of rolling elements 58 may be employed. Further, the rolling elements 58 may be arranged in any suitable configuration. For example, as shown generally in figures, a single row of rolling elements 58 is employed, wherein each of the rolling elements 58 is circumferentially spaced within the raceways 66, 68 of the inner and/or outer races 56, 54. In still further embodiments, multiple, axially-spaced rows of rolling elements 58 may be utilized in the bearing assembly 80 to provide additional strength. For example, in various embodiments, two, three, or more rows of rolling elements 58 may be employed.

As mentioned, the bearing assembly 80 also includes a cage assembly 70 configured to maintain separation between neighboring rolling elements 58. For example, referring particularly to FIGS. 3 and 5-7, the cage assembly 70 may include a plurality of cage elements 72 separated by a plurality of spacers 74. In addition, in one embodiment, each of the cage elements 72 may extend around at least a portion of the plurality of rolling elements 58. For example, as shown in FIG. 3, the cage elements 72 extend at least partially around four rolling elements 58. More specifically, each of the cage elements 72 includes a plurality of inner openings 76 and one or more open-end slots 78 configured to extend around at least a portion of one of the rolling elements 58. For example, as shown generally in the figures, each of the inner openings 76 completely surrounds one of the rolling elements 58, whereas each of the open end-slots 78 partially surrounds one of the rolling elements 58.

It should be understood that each cage element 72 may include any suitable number of inner openings 76 and/or open-end slots 78. For example, as shown in FIGS. 3 and 5, each of the cage elements 72 includes two inner openings 76. However, in an alternative embodiment, the cage elements 72 may each include more than two or less than two inner openings 76. In still further embodiments, one or more of the cage elements 72 may include a different number of inner openings 76 than other cage elements 72. Similarly, as shown in FIGS. 3 and 5, each of the cage elements 72 includes two open-end slots 78. However, in an alternative embodiment, the cage elements 72 may each include more than two or less than open-end slots 78.

In addition, as shown in FIGS. 6 and 7, the open-end slots 78 are configured to receive a first portion 62 of one of the rolling elements 58. For example, as shown, the open-end slot 78 receives approximately half of one of the rolling elements 58. As such, a second portion 64 of the rolling element 58 may extend longitudinally outside of the open-end slot 78 of the cage elements 72, the longitudinal direction being defined by arrow 82. Accordingly, in one embodiment, the open-end slots 78 of the cage elements 72 stop short of encapsulating the entire rolling element 58 such that neighboring cage elements 72 do not contact one another. In addition, one or more spacers 74 are provided between neighboring cage elements 72 to maintain separation between neighboring rolling elements 58. For example, as shown generally in the figures, at least one spacer 74 is configured between neighboring cage elements 72 such that the cage elements 72 do not contact each other. More specifically, the spacer 74 may be configured such that it directly contacts one or more of the rolling elements 58 configured in neighboring open-end slots 78 so as to separate each cage element 72 and form the cage assembly 70. As such, each of the spacers 74 may be configured to receive a portion of at least one of the plurality of rolling elements 58.

The spacers 74 may be constructed of any suitable material and may define any suitable shape, and/or dimensions. For example, in one embodiment, the spacers 74 may be constructed of any suitable metal, rubber, or plastic material, or any other suitable material. More specifically, in various embodiments, the materials of construction of the spacers 74 may include steel, bronze, brass, aluminum, nylon, teflon, phenolic resin, polyamide, or any other plastics. As such, in some embodiments, the spacers 74 may be a generally flexible material or may be a generally rigid material. In addition, the spacers 74 may have any suitable shape. For example, in one embodiment, the spacers 74 may be shaped to accommodate one or more of the rolling elements 58, while also being configured to remain in the correct position within the raceways. Further, the spacers 74 may be configured to remain stationary relative to the rolling elements 58. For example, in another embodiment, the spacers 74 may have a cylindrical shape with two concave ends that correspond to the rolling elements 58. As such, the cylinder diameter may be slightly smaller than the diameter of the rolling element 58 such that the spacer 74 remains in place within the bearing. In addition, all of the spacers 74 may have the same dimensions or may each have different dimensions. Thus, the spacers 74 can be designed to provide any suitable distance between neighboring rolling elements 58.

In additional embodiments, and referring particularly to FIGS. 6 and 7, each of the inner openings 76 may be separated by a predetermined distance $D_1$. In addition, the spacers 74 may define a predetermined depth $D_2$, wherein $D_2$ is defined as the distance separating the rolling elements 58. Further, as shown in the illustrated embodiment, the predetermined depth $D_2$ may be less than the predetermined distance $D_1$. In such an embodiment, the smaller depth $D_2$ defined by the spacers 74 may provide more space for additional rolling elements 58 (when compared to single- and multi-piece cages having fixed spacing between all rolling elements 58), which can add capacity to the bearing assembly 80. In alternative embodiments, the predetermined distance $D_1$ may be substantially equal to the predetermined depth $D_2$. In still another embodiment, the predetermined distance $D_1$ may be less than the predetermined depth $D_2$.

It should also be understood that the cage elements 72 may have any suitable shape and may be constructed of any suitable material. For example, as shown in FIG. 6, the cages elements may have a generally rectangular shape. Alternatively, as shown in FIG. 7, the cage elements 72 may define an oscillating peak-and-valley shape corresponding to the rolling elements (peaks) and spacing (valleys) therebetween. As shown, such a configuration may utilize less material than the rectangular shape illustrated in FIG. 6. In still further embodiments, any other suitable shape may be utilized for the cage elements 72. In addition, all of the cage elements 72 may have the same shape or one or more of the cage elements 72 may have a different shape.

Additionally, as shown in FIG. 5, each of the cage elements 72 may define a generally arcuate profile so as to form a radial cage assembly 70 when arranged within or around the inner and/or outer races 54, 56. As such, in one embodiment, the cage assembly 70 generally corresponds to the shape of the inner and/or outer races 56, 54 when therein. In alternative embodiments, the cage elements 72 may each define a generally linear profile. In still additional embodiments, any other suitable profile may be utilized for the cage elements 72. Further, all of the cage elements 72 may have the same profile or one or more of the cage elements 72 may have a different profile.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a wind turbine, comprising;
an outer race;
an inner race rotatable relative to the outer race;
a plurality of rolling elements positioned between the inner and outer race; and,
a cage assembly configured to maintain separation between neighboring rolling elements, the cage assembly comprising:
a plurality of cage elements, each of the cage elements extending around a portion of the plurality of roiling elements; and
a plurality of spacers, wherein adjacent cage elements are separated by at least one of the spacers, and wherein the spacers are configured between and contact neighboring rolling elements.

2. The bearing assembly of claim 1, wherein each of the cage elements comprises a plurality of inner openings, each of the inner openings configured to surround at least one of the rolling elements.

3. The bearing assembly of claim 2, wherein each of the inner openings are separated by a predetermined distance, wherein one or more of the spacers defines a predetermined depth, and wherein the predetermined depth is less than the predetermined distance.

4. The bearing assembly of claim 1, wherein each of the cage elements further comprise opposing open-end slots, each of the open-end slots configured to receive a first portion of one of the rolling elements.

5. The bearing assembly of claim 4, wherein a second portion of the rolling element extends longitudinally outside of one of the open-end slots of the cage elements.

6. The bearing assembly of claim 1, wherein each of the plurality of spacers are configured to receive a portion of at least one of the plurality of rolling elements.

7. The bearing assembly of claim 1, wherein the cage assembly is placed around or within at least one of the inner race or the outer race.

8. The bearing assembly of claim 1, wherein the plurality of rolling elements comprise at least one of the following: a ball, a sphere, a roller, a tapered roller, a barrel-shaped roller, or a cylindrical element.

9. The bearing assembly of claim 1, wherein the bearing assembly comprises at least one of a pitch bearing or a yaw bearing.

10. A bearing assembly for a wind turbine, comprising;
an outer race;
an inner race rotatable relative to the outer race;
a plurality of rolling elements positioned between the inner and outer race; and,
a cage assembly configured to maintain separation between neighboring rolling elements, the cage assembly comprising:
a plurality of cage elements, each of the cage elements extending around a portion of the plurality of rolling elements, each of the cage elements comprising opposing open-end slots configured to receive a first portion of one of the rolling elements such that a second portion of the rolling element extends longitudinally outside of the cage elements; and, a plurality of spacers, wherein adjacent cage elements are separated by at least one of the spacers.

11. The bearing assembly of claim 10, wherein each of the spacers contact neighboring rolling elements.

12. The bearing assembly of claim 10, wherein each of the cage elements comprises a plurality of inner openings, each of the inner openings configured to surround at least one of the rolling elements.

13. The bearing assembly of claim 12, wherein each of the inner openings are separated by a predetermined distance, wherein one or more of the spacers define a predetermined depth, and wherein the predetermined depth is less than the predetermined distance.

14. The bearing assembly of claim 10, wherein each of the plurality of spacers are configured to receive the second portions of the rolling elements.

15. The bearing assembly of claim 10, wherein the cage assembly is placed around or within at least one of the inner race or the outer race.

16. The bearing assembly of claim 10, wherein the bearing assembly comprises at least one of a pitch bearing or a yaw bearing.

17. A cage assembly for a rolling-element bearing, the cage assembly configured to maintain separation between neighboring rolling elements of the bearing, the cage assembly comprising:

a plurality of cage elements, each of the cage elements configured to extend around a portion of a plurality of the rolling elements of the bearing; and, a plurality of spacers configured to separate adjacent cage elements, wherein the spacers are configured to contact neighboring rolling elements.

18. The cage assembly of claim 17, wherein each of the cage elements comprises a plurality of inner openings, each of the inner openings configured to surround at least one of the rolling elements.

19. The cage assembly of claim 17, wherein each of the cage elements further comprise opposing open-end slots configured to receive a first portion of one of the rolling elements such that, when installed, a second portion of the rolling element extends longitudinally outside of the cage elements.

20. The cage assembly of claim 17, wherein the cage assembly is configured to be placed around or within at least one of an inner race or an outer race of the bearing, and wherein the bearing comprises at least one of a pitch bearing or a yaw bearing of a wind turbine.

* * * * *